United States Patent
Yoda et al.

(10) Patent No.: US 12,078,769 B2
(45) Date of Patent: Sep. 3, 2024

(54) MONITORING SYSTEM, MONITORING DEVICE, MONITORING METHOD, AND NON-TRANSITORY COMPUTER-READABLE MEDIUM

(71) Applicant: NEC Corporation, Tokyo (JP)

(72) Inventors: Yukihide Yoda, Tokyo (JP); Yoshiaki Aono, Tokyo (JP); Koji Asahi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 214 days.

(21) Appl. No.: 17/441,395

(22) PCT Filed: Dec. 13, 2019

(86) PCT No.: PCT/JP2019/049060
§ 371 (c)(1),
(2) Date: Sep. 21, 2021

(87) PCT Pub. No.: WO2020/202654
PCT Pub. Date: Oct. 8, 2020

(65) Prior Publication Data
US 2022/0171082 A1    Jun. 2, 2022

(30) Foreign Application Priority Data
Mar. 29, 2019 (JP) .................. 2019-068644

(51) Int. Cl.
*G01V 1/22* (2006.01)
*G01D 5/353* (2006.01)
*G01V 1/01* (2024.01)
*G01V 1/30* (2006.01)

(52) U.S. Cl.
CPC .......... *G01V 1/226* (2013.01); *G01D 5/35358* (2013.01); *G01V 1/01* (2024.01);
(Continued)

(58) Field of Classification Search
CPC .......... G01V 1/226; G01V 1/008; G01V 1/30; G01V 2210/60; G01V 2210/1427; G01V 2210/1425; G01D 5/35358
See application file for complete search history.

(56) References Cited

U.S. PATENT DOCUMENTS 4,235,113 A * 11/1980 Carome ................. G01H 9/004
 385/12
7,411,863 B2 * 8/2008 Toennessen ........ H01M 8/1004
 367/20
(Continued)

FOREIGN PATENT DOCUMENTS

JP     S57-028278 A    2/1982
JP     S61-091587 A    5/1986
(Continued)

OTHER PUBLICATIONS

International Search Report for PCT Application No. PCT/JP2019/049060, mailed on Feb. 25, 2020.
(Continued)

*Primary Examiner* — Elias Desta
(74) *Attorney, Agent, or Firm* — Sughrue Mion, PLLC

(57) ABSTRACT

A monitoring system according to the present disclosure includes an optical fiber (10) laid on a ground or a seabed, an optical fiber sensing unit (21) configured to receive an optical signal from the optical fiber (10) and detect a vibration produced in the ground or the seabed based on the optical signal, and an analyzing unit (22) configured to identify a natural phenomenon that has caused the detected vibration based on a unique pattern of the detected vibration.

14 Claims, 19 Drawing Sheets

(52) U.S. Cl.
CPC ........ *G01V 1/30* (2013.01); *G01V 2210/1425* (2013.01); *G01V 2210/1427* (2013.01); *G01V 2210/60* (2013.01)

(56) References Cited

U.S. PATENT DOCUMENTS

| | | | |
|---|---|---|---|
| 7,755,971 B2* | 7/2010 | Heatley | G01V 1/16 367/16 |
| 9,140,815 B2* | 9/2015 | Lopez | G01V 1/16 |
| 10,067,507 B2* | 9/2018 | Davoodi | B63B 22/22 |
| 2011/0069302 A1 | 3/2011 | Hill et al. | |
| 2019/0033543 A1 | 1/2019 | Freeland et al. | |

FOREIGN PATENT DOCUMENTS

| | | |
|---|---|---|
| JP | S62-046831 B2 | 2/1987 |
| JP | H08-128869 A | 5/1996 |
| JP | 2001-221684 A | 8/2001 |
| JP | 4660645 B2 | 3/2011 |

OTHER PUBLICATIONS

Ohsumi, Tsuneo et al., "Study of detection system for debris flows, earthquake and noise by vibration sensor", Journal of the Japan Society of Erosion Control Engineering, vol. 59, No. 3, Sep. 15, 2006, pp. 38-43.

Fujihashi, Kazuhiko et al., "Initiatives in disaster prevention field using optical fiber sensing technology", NTT Technical Review, vol. 19, No. 9, 2007, pp. 52-56.

Extended European Search Report for EP Application No. 19922782.8 dated on Apr. 5, 2022.

Li Zefeng et al: "Pushing the limit of earthquake detection with distributed acoustic sensing and template matching: a case study at the Brady geothermal field", Geophysical Journal International., vol. 215, No. 3, Sep. 3, 2018, pp. 1583-1593.

Nathaniel J Lindsey et al: "Fiber-Optic Network Observations of Earthquake Wavefields", The 3rd EAA European Congress On Acoustics(Forum Acusticum 2002), vol. 44, No. 23, Dec. 8, 2017.

EP Office Action for EP Application No. 19922782.8, mailed on Mar. 29, 2023.

Perol Thibaut et al: "Convolutional neural network for earthquake detection and location", Science Advances, vol. 4, No. 2, Feb. 2, 2018.

Shiloh Lihi et al: "Deep Learning Approach for Processing Fiber-Optic DAS Seismic Data", 26th International Conference on Optical Fiber Sensors, Jan. 1, 2018.

Asim Khawaja M. et al: "Earthquake prediction model using support vector regressor and hybrid neural networks", PLOS ONE, vol. 13, No. 7, Jul. 5, 2018.

\* cited by examiner

| AREA | DEGREE OF MATCH WITH EARTHQUAKE | PREDICTED SEISMIC INTENSITY |
|---|---|---|
| R1 | 80% | 4 |
| R2 | 70% | 3 |
| : | : | : |

Fig. 5

| VIBRATION DATA | TYPES OF NATURAL PHENOMENA |
|---|---|
| A | EARTHQUAKE |
| B | VOLCANIC TREMOR |
| C | CRUSTAL MOVEMENT |

Fig. 7

| VIBRATION DATA | RISK OF NATURAL PHENOMENON |
|---|---|
| A | NORMAL |
| B | ANOMALOUS (RISK LEVEL1) |
| C | ANOMALOUS (RISK LEVEL2) |

Fig. 19

MONITORING SYSTEM, MONITORING DEVICE, MONITORING METHOD, AND NON-TRANSITORY COMPUTER-READABLE MEDIUM

This application is a National Stage Entry of PCT/JP2019/049060 filed on Dec. 13, 2019, which claims priority from Japanese Patent Application 2019-068644 filed on Mar. 29, 2019, the contents of all of which are incorporated herein by reference, in their entirety.

TECHNICAL FIELD

The present disclosure relates to monitoring systems, monitoring devices, monitoring methods, and non-transitory computer-readable media.

BACKGROUND ART

Conventionally, the seismic intensity is measured with a seismometer when an earthquake occurs. However, seismometers can monitor the state of vibrations only at the points where the seismometers are installed and are thus not capable of comprehensively monitoring the entire area where an earthquake has occurred.

Meanwhile, some technologies have been proposed recently where a natural phenomenon, such as an earthquake or a tsunami, is monitored by use of optical fibers.

For example, according to the technique described in Patent Literature 1, a cable formed by covering a plurality of optical fiber loops of different lengths is laid on a seabed. Then, the plurality of optical fiber loops each detect a load exerted by seawater, and a determination is made as to which one of a tsunami, an underwater acoustic wave, and a seismic wave a moving load corresponds to based on the moving speed of that load.

CITATION LIST

Patent Literature

Patent Literature 1: Japanese Unexamined Patent Application Publication No. H08-128869

SUMMARY OF INVENTION

Technical Problem

As described above, according to the technique described in Patent Literature 1, a determination is made about a natural phenomenon, such as an earthquake or a tsunami, based on the moving speed of a load obtained at a plurality of observation points. Such a technique, however, has shortcomings in that a more precise monitoring is difficult. For example, it is difficult to differentiate between an earthquake and a volcanic tremor or between the S wave and the P wave of a seismic wave with the above-described technique.

Accordingly, the present disclosure is directed to addressing such shortcomings and directed to providing a monitoring system, a monitoring device, a monitoring method, and a non-transitory computer-readable medium that are capable of identifying a natural phenomenon with higher accuracy and with details.

Solution to Problem

A monitoring system according to one aspect includes:
an optical fiber laid on a ground or a seabed;
an optical fiber sensing unit configured to receive an optical signal from the optical fiber and detect a vibration produced in the ground or the seabed based on the optical signal; and
an analyzing unit configured to identify a natural phenomenon that has caused the detected vibration based on a unique pattern of the detected vibration.

A monitoring device according to one aspect includes:
an optical fiber sensing unit configured to receive an optical signal from an optical fiber laid on a ground or a seabed and detect a vibration produced in the ground or the seabed based on the optical signal; and
an analyzing unit configured to identify a natural phenomenon that has caused the detected vibration based on a unique pattern of the detected vibration.

A monitoring method according to one aspect includes:
a step of receiving an optical signal from an optical fiber laid on a ground or a seabed and detecting a vibration produced in the ground or the seabed based on the optical signal; and
a step of identifying a natural phenomenon that has caused the detected vibration based on a unique pattern of the detected vibration.

A non-transitory computer-readable medium according to one aspect is
a non-transitory computer-readable medium storing a program that causes a computer to execute:
a procedure of receiving an optical signal from an optical fiber laid on a ground or a seabed and detecting a vibration produced in the ground or the seabed based on the optical signal; and
a procedure of identifying a natural phenomenon that has caused the detected vibration based on a unique pattern of the detected vibration.

Advantageous Effects of Invention

The above aspects can advantageously provide a monitoring system, a monitoring device, a monitoring method, and a non-transitory computer-readable medium that are capable of identifying a natural phenomenon with higher accuracy and with details.

BRIEF DESCRIPTION OF THE DRAWINGS

FIG. 5 illustrates an example of a GUI screen showing a result of identifying a natural phenomenon identified by an analyzing unit according to the first example embodiment.

FIG. 7 illustrates an example of training data to be used in the machine learning to be executed by the analyzing unit according to the first example embodiment.

FIG. 19 illustrates an example of training data to be used in machine learning to be executed by an analyzing unit according to another example embodiment.

DESCRIPTION OF EMBODIMENTS

Hereinafter, some example embodiments of the present disclosure will be described with reference to the drawings.

First Example Embodiment

Configuration of First Example Embodiment

First, with reference to FIG. 1, a configuration of a monitoring system according to a first example embodiment will be described.

Figure 1:
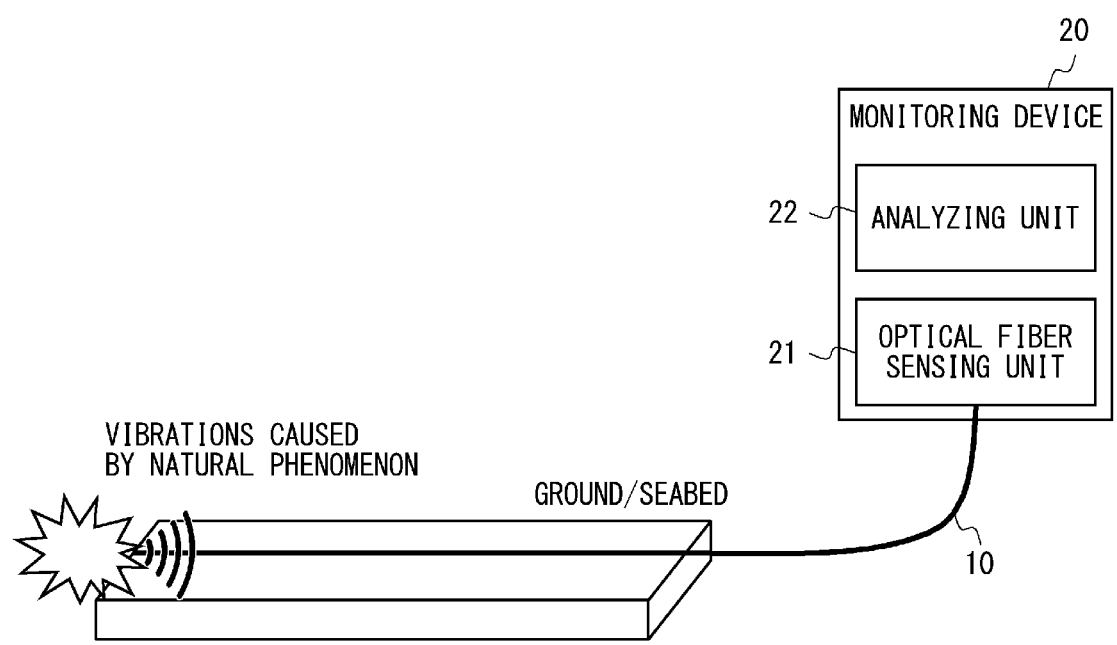
FIG. 1 illustrates an example of a configuration of a monitoring system according to a first example embodiment.

As illustrated in FIG. 1, the monitoring system according to the first example embodiment includes an optical fiber 10 and a monitoring device 20.

Figure 2:
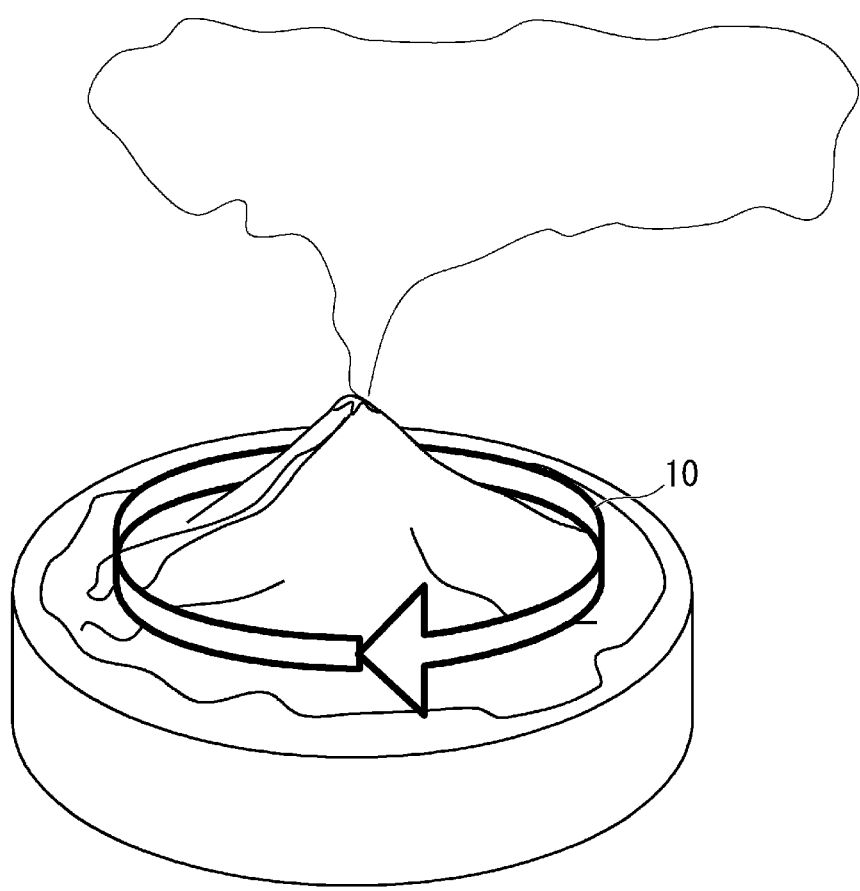
FIG. 2 illustrates an example of how an optical fiber is arranged when the optical fiber is laid around a volcano according to the first example embodiment.
Figure 3:
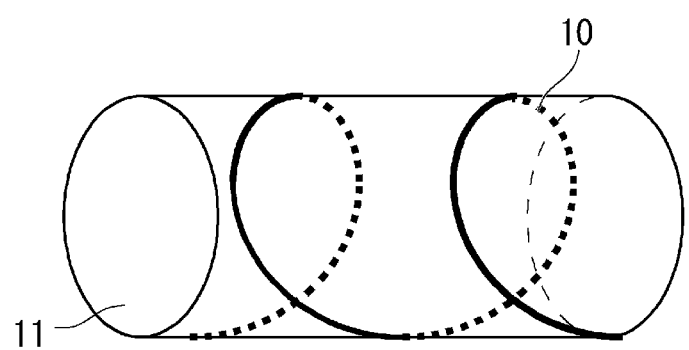
FIG. 3 illustrates an example of how an optical fiber is configured when the optical fiber is laid according to the first example embodiment.

The optical fiber 10 is laid on the ground or the seabed in an area where a natural phenomenon is to be monitored. Examples of a natural phenomenon include an earthquake, a tsunami, a volcanic tremor, a crustal movement, a volcanic activity, accumulation of magma under the ground, and a movement of groundwater. For example, in a case where a volcano is to be monitored, the optical fiber 10 is laid so as to surround the volcano at its level ground portion, as illustrated in FIG. 2. In this case, the optical fiber 10 may be laid with the optical fiber 10 helically wound on a center tube 11, as illustrated in FIG. 3, for example. Alternatively, the optical fiber 10 may be laid in the form of an optical fiber cable (not illustrated) formed by covering the optical fiber 10.

The monitoring device 20 serves to monitor a natural phenomenon that occurs in an area where the optical fiber 10 is laid. The monitoring device 20 includes an optical fiber sensing unit 21 and an analyzing unit 22. In this example, the optical fiber sensing unit 21 and the analyzing unit 22 may be provided in separate devices and configured to be capable of communicating with each other.

The optical fiber sensing unit 21 is connected to the optical fiber 10 and inputs pulsed light to the optical fiber 10. Moreover, the optical fiber sensing unit 21 receives, from the optical fiber 10, back-reflection light that arises at each transmission distance as pulsed light is transmitted through the optical fiber 10.

When a natural phenomenon, such as an earthquake, a tsunami, a volcanic tremor, a crustal movement, a volcanic activity, or a movement of groundwater, occurs in an area where the optical fiber 10 is laid, vibrations are produced. For example, in the case of an earthquake, vibrations corresponding to the seismic vibrations or the movement of the ground are produced. In the case of a tsunami, vibrations corresponding to the movement of seawater are produced. In the case of a volcanic tremor, a crustal movement, or a volcanic activity, vibrations corresponding to the movement of the ground are produced. In the case of a movement of groundwater, variations corresponding to the movement of the groundwater are produced. These vibrations are propagated to the optical fiber 10 and superposed onto back-reflection light transmitted through the optical fiber 10. Accordingly, the optical fiber sensing unit 21 can detect vibrations produced through a natural phenomenon based on the backscattering light received from the optical fiber 10. Moreover, the optical fiber sensing unit 21 can further detect the position where the received backscattering light has been generated (the distance from the optical fiber sensing unit 21) based on the time passing from when the optical fiber sensing unit 21 has input pulsed light to the optical fiber 10 to when the optical fiber sensing unit 21 has received the backscattering light superposed with the vibrations.

For example, the optical fiber sensing unit 21 detects backscattering light received from the optical fiber 10 by use of a distributed vibration sensor. Thus, the optical fiber sensing unit 21 can detect vibrations produced through a natural phenomenon as well as the position where the backscattering light superposed with these vibrations has been generated and can thus acquire vibration data of the detected vibrations.

Figure 4:
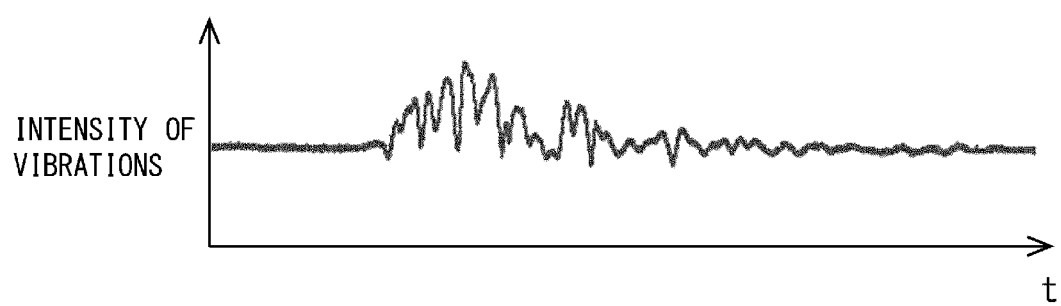
FIG. 4 illustrates an example of vibration data to be acquired by an optical fiber sensing unit according to the first example embodiment.

In this example, a vibration pattern of vibrations detected by the optical fiber sensing unit 21 is a fluctuation pattern that fluctuates dynamically, as illustrated in FIG. 4, for example. FIG. 4 illustrates vibration data of vibrations detected at a certain position in the optical fiber 10. The horizontal axis represents the time, and the vertical axis represents the intensity of the vibrations. The vibration pattern of vibrations detected by the optical fiber sensing unit 21 varies depending on the type of a natural phenomenon that has caused the vibrations. Therefore, the vibration data of vibrations detected by the optical fiber sensing unit 21 has a dynamic, unique pattern where the fluctuations of the intensity of the vibrations, the position of the vibrations, the number of the vibrations, for example, change differently depending on the type of a natural phenomenon.

Therefore, the analyzing unit 22 analyzes the dynamic change of the unique pattern of vibration data acquired by the optical fiber sensing unit 21 and can thus identify a natural phenomenon that has caused the vibrations. Specifically, the analyzing unit 22 can identify a natural phenomenon that has caused vibrations from among, for example but not limited to, an earthquake, a tsunami, a volcanic tremor, a crustal movement, a volcanic activity, and a movement of groundwater.

Now, a method with which the analyzing unit 22 identifies a natural phenomenon that has caused vibrations will be described in detail. The analyzing unit 22 may identify a natural phenomenon with either of the following methods A1 and A2.

(1) Method A1

First, the method A1 will be described.

The method A1 identifies a natural phenomenon that has caused vibrations by use of pattern matching.

When the analyzing unit 22 is to identify a natural phenomenon that has caused vibrations, the analyzing unit 22 acquires vibration data monitoring the vibrations (e.g., vibration data similar to the vibration data illustrated in FIG. 4) from the optical fiber sensing unit 21. The analyzing unit 22 then compares the unique pattern of the acquired vibration data against a preset pattern for matching and identifies a natural phenomenon if the unique pattern matches the pattern for matching. In this example, the analyzing unit 22 may hold a plurality of patterns for matching corresponding to a plurality of natural phenomena and identify a natural phenomenon among the plurality of natural phenomena by comparing the unique pattern against each of the patterns for matching corresponding to the plurality of natural phenomena.

In this case, the analyzing unit 22 may calculate the rate of match of the unique pattern against a pattern for matching and compare the calculated rate of match against a threshold. Thus, the analyzing unit 22 may determine whether the unique pattern matches the pattern for matching. For example, in the example shown in Table 1, the analyzing unit 22 determines that it is a match if the rate of match is 70% or higher, determines that it is not a match if the rate of match is 40% or lower, or determines that there is a possibility of a match if the rate of match is between 40% and 70%.

TABLE 1

| Rate of Match | Match/Not Match |
| --- | --- |
| 70% or higher | Match |
| 40% to 70% | Possibility of Match |
| 40% or lower | Not Match |

Moreover, the analyzing unit 22 may learn a pattern for matching through machine learning (e.g., deep learning or the like). Furthermore, the analyzing unit 22 may update or add a pattern for matching, as needed, through machine learning.

The analyzing unit 22 may display, on a display device (not illustrated), a graphical user interface (GUI) screen showing the result of identifying a natural phenomenon. For example, in the example illustrated in FIG. 5, the degree of match with an earthquake and the predicted seismic intensity in each area are displayed on the GUI screen. In this example, with regard to the predicted seismic intensity, the analyzing unit 22 may cooperate with an existing seismometer and learn the pattern of association between a unique pattern and the seismic intensity observed with the seismometer when that unique pattern is obtained. In a case where the analyzing unit 22 displays the degree of match with an earthquake, the analyzing unit 22 may calculate the risk of a tsunami and further display the calculated risk of a tsunami on the GUI screen. In a case where the analyzing unit 22 displays the risk of a tsunami, the analyzing unit 22 may also detect whether a tsunami has occurred when an earthquake has occurred and learn the pattern of association between a unique pattern and whether a tsunami has occurred when that unique pattern has been obtained.

(2) Method A2

Next, the method A2 will be described.

The method A2 involves machine learning (e.g., deep learning or the like) of, as a unique pattern of each vibration data, unique patterns corresponding to the types of natural phenomena and identifies a natural phenomenon by use of the learning result (initial training model) of the machine learning.

Now, with reference to FIG. 6, a method of machine learning in the method A2 will be described.

Figure 6:
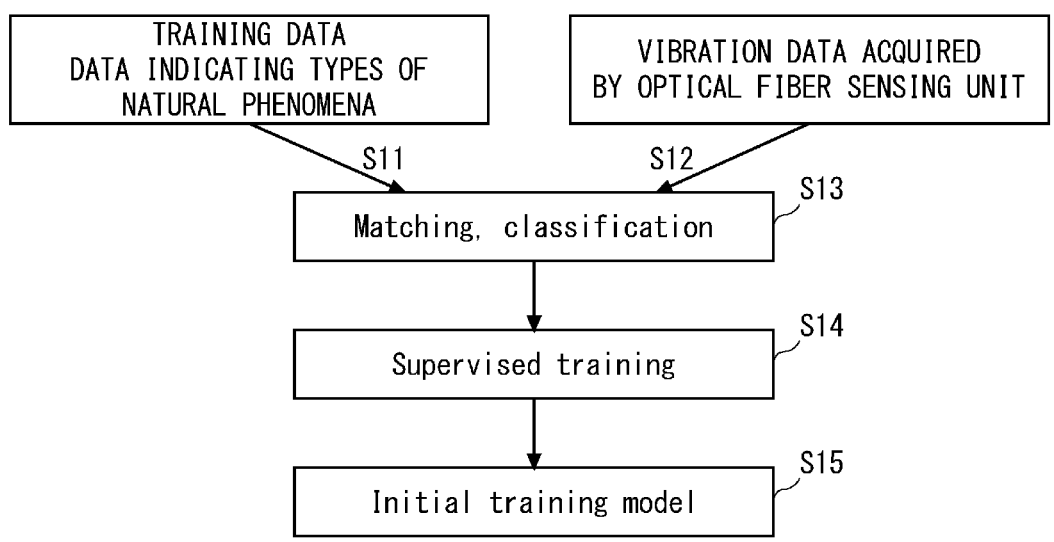
FIG. 6 is a flowchart illustrating an example of machine learning to be executed by the analyzing unit according to the first example embodiment.

As illustrated in FIG. 6, the analyzing unit 22 receives input of training data indicating the type of a natural phenomenon and vibration data representing vibrations produced through that natural phenomenon and acquired by the optical fiber sensing unit 21 (steps S11 and S12). FIG. 7 illustrates an example of the training data. FIG. 7 illustrates an example of the training data for training a model on three pieces of vibration data A, B, and C. Each vibration data, for example, takes the form similar to the vibration data illustrated in FIG. 4.

Next, the analyzing unit 22 performs matching and classification of the training data and the vibration data (step S13) and undergoes supervised training (step S14). This produces an initial training model (step S15). This initial training model serves as a model that, in response to an input of monitored vibration data, outputs the type of the natural phenomenon that has caused the vibrations.

When the analyzing unit 22 is to identify a natural phenomenon that has caused vibrations, the analyzing unit 22 acquires vibration data monitoring the vibrations (e.g., vibration data similar to the vibration data illustrated in FIG. 4) from the optical fiber sensing unit 21 and inputs the acquired vibration data to the initial training model. Thus, the analyzing unit 22 obtains, from the result output by the initial training model, the natural phenomenon that has caused the vibrations.

Next, with reference to FIG. 8, a hardware configuration of a computer 40 that implements the monitoring device 20 according to the first example embodiment will be described.

Figure 8:
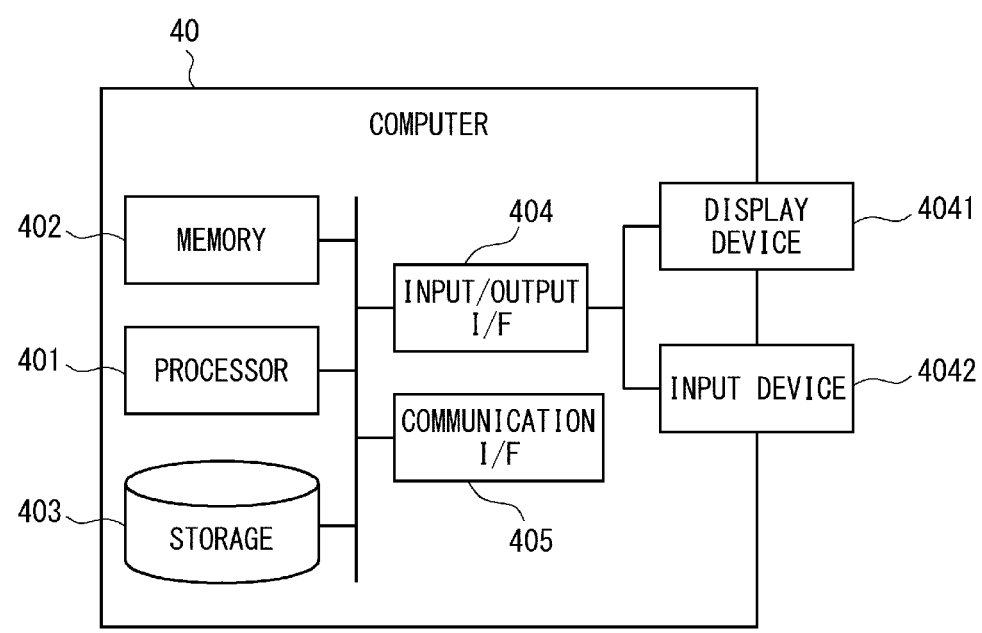
FIG. 8 is a block diagram illustrating an example of a hardware configuration of a computer that implements a monitoring device according to the first example embodiment.

As illustrated in FIG. 8, the computer 40 includes a processor 401, a memory 402, a storage 403, an input/output interface (input/output I/F) 404, and a communication interface (communication I/F) 405, for example. The processor 401, the memory 402, the storage 403, the input/output interface 404, and the communication interface 405 are connected to each other by a data transmission line for transmitting and receiving data therebetween.

The processor 401 is an arithmetic operation processing device, such as a central processing unit (CPU) or a graphics processing unit (GPU), for example. The memory 402 is a memory, such as a random-access memory (RAM) or a read-only memory (ROM), for example. The storage 403 is a storage device, such as a hard-disk drive (HDD), a solid-state drive (SSD), or a memory card, for example. The storage 403 may also be a memory, such as a RAM or a ROM.

The storage 403 stores programs for implementing the functions of the optical fiber sensing unit 21 and the analyzing unit 22 included in the monitoring device 20. The processor 401 executes these programs and thus implements each function of the optical fiber sensing unit 21 and the analyzing unit 22. When the processor 401 executes these programs, the processor 401 may execute the programs upon loading them onto the memory 402 or execute the programs without loading them onto the memory 402. The memory 402 or the storage 403 also serves to store information or data held by the optical fiber sensing unit 21 and the analyzing unit 22.

These programs can be stored by use of various types of non-transitory computer-readable media and supplied to a computer (including the computer 40). The non-transitory computer-readable media include various types of tangible storage media. Examples of the non-transitory computer-readable media include a magnetic storage medium (e.g., a flexible disk, a magnetic tape, a hard-disk drive), an optical magnetic storage medium (e.g., a magneto-optical disk), a compact disc-ROM (CD-ROM), a CD-recordable (CD-R), a CD-rewritable (CD-R/W), and a semiconductor memory (e.g., a mask ROM, a programmable ROM (PROM), an erasable PROM (EPROM), a flash ROM, a RAM). The programs may also be supplied to a computer in the form of various types of transitory computer-readable media. Examples of the transitory computer-readable media include an electric signal, an optical signal, and an electromagnetic wave. The transitory computer-readable media can supply the programs to a computer via a wired communication line, such as an electric wire or an optical fiber, or via a wireless communication line.

The input/output interface 404 is connected to a display device 4041 and an input device 4042, for example. The display device 4041 is a device, such as a liquid-crystal display (LCD) or a cathode-ray tube (CRT) display, that displays a screen corresponding to drawing data processed by the processor 401. The input device 4042 is a device that receives an operator's operation input. The input device 4042 is, for example but not limited to, a keyboard, a mouse, or a touch sensor. The display device 4041 and the input device 4042 may be integrated and implemented in the form of a touch panel. The computer 40 may include a sensor (not illustrated), such as a distributed vibration sensor, and this sensor may be connected to the input/output interface 404.

The communication interface 405 transmits and receives data to and from an external device. For example, the communication interface 405 communicates with an external device via a wired communication line or a wireless communication line.

Operation of First Example Embodiment

Now, with reference to FIG. 9, a general flow of an operation of the monitoring system according to the first example embodiment will be described.

Figure 9:
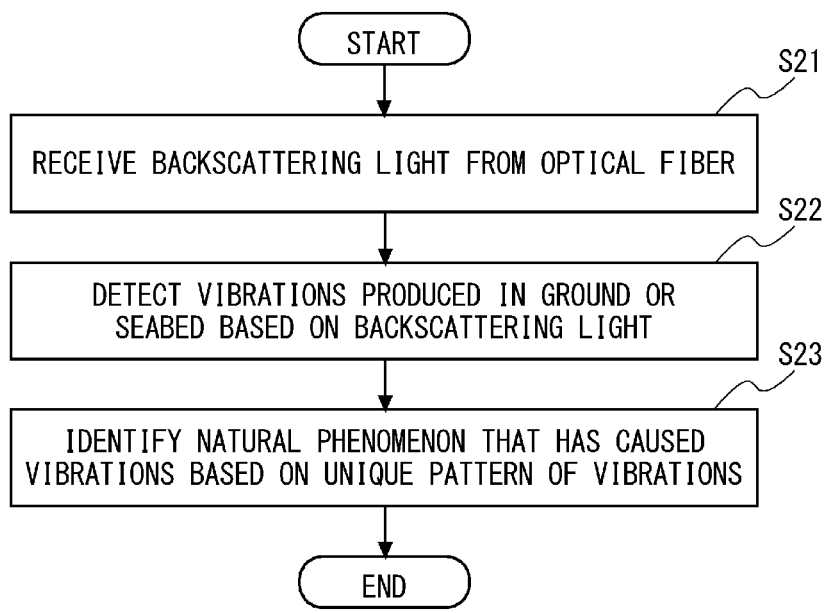
FIG. 9 is a flowchart illustrating an example of a flow of an operation of the monitoring system according to the first example embodiment.

As illustrated in FIG. 9, first, the optical fiber sensing unit 21 inputs pulsed light to the optical fiber 10 laid on the ground or the seabed and receives backscattering light from the optical fiber 10 (step S21).

Next, the optical fiber sensing unit 21 detects vibrations produced in the ground or the seabed based on the backscattering light received from the optical fiber 10 (step S22).

Then, the analyzing unit 22 identifies a natural phenomenon that has caused the vibrations based on the unique pattern of the vibrations detected by the optical fiber sensing unit 21 (step S23). At this point, the analyzing unit 22 may identify the natural phenomenon with either of the methods A1 and A2 described above.

Advantageous Effects of First Example Embodiment

As described above, according to the first example embodiment, the optical fiber sensing unit 21 detects vibrations produced in the ground or the seabed based on backscattering light (optical signal) received from the optical fiber 10, and the analyzing unit 22 identifies a natural phenomenon that has caused the vibrations based on the unique pattern of the vibrations detected by the optical fiber sensing unit 21. This configuration makes it possible to identify a natural phenomenon that has caused vibrations more specifically.

Moreover, according to the first example embodiment, the analyzing unit 22 identifies a natural phenomenon that has caused vibrations based on the unique pattern of the vibrations, as described above. In other words, the analyzing unit 22, for example, identifies a natural phenomenon by dynamically analyzing the pattern of the change of the vibrations (e.g., a change in the varying intensity of the vibrations), instead of identifying a natural phenomenon based on a rough standard, such as the magnitude of the vibrations (e.g., identifying a natural phenomenon based on large vibrations and a high number of vibrations). Therefore, a natural phenomenon can be identified with higher accuracy.

According to the first example embodiment, vibrations are detected by use of the optical fiber 10 laid on the ground or the seabed. Therefore, unlike seismometers that detect vibrations at points, the optical fiber 10 can detect vibrations along a line. This configuration makes it possible to comprehensively monitor the entire area where the optical fiber 10 is laid.

According to the first example embodiment, an optical fiber sensing technology where the optical fiber 10 is used as a sensor is utilized. This can provide such advantages that the sensing is not affected by electromagnetic noise, no power needs to be fed to the sensor, the technology excels in the environment resistance, or the maintenance becomes easier.

Second Example Embodiment

Configuration of Second Example Embodiment

First, with reference to FIG. 10, a configuration of a monitoring system according to a second example embodiment will be described.

In the monitoring system according to the first example embodiment described above, the optical fiber 10 is laid one-dimensionally and linearly on the ground or the seabed.

Figure 10:
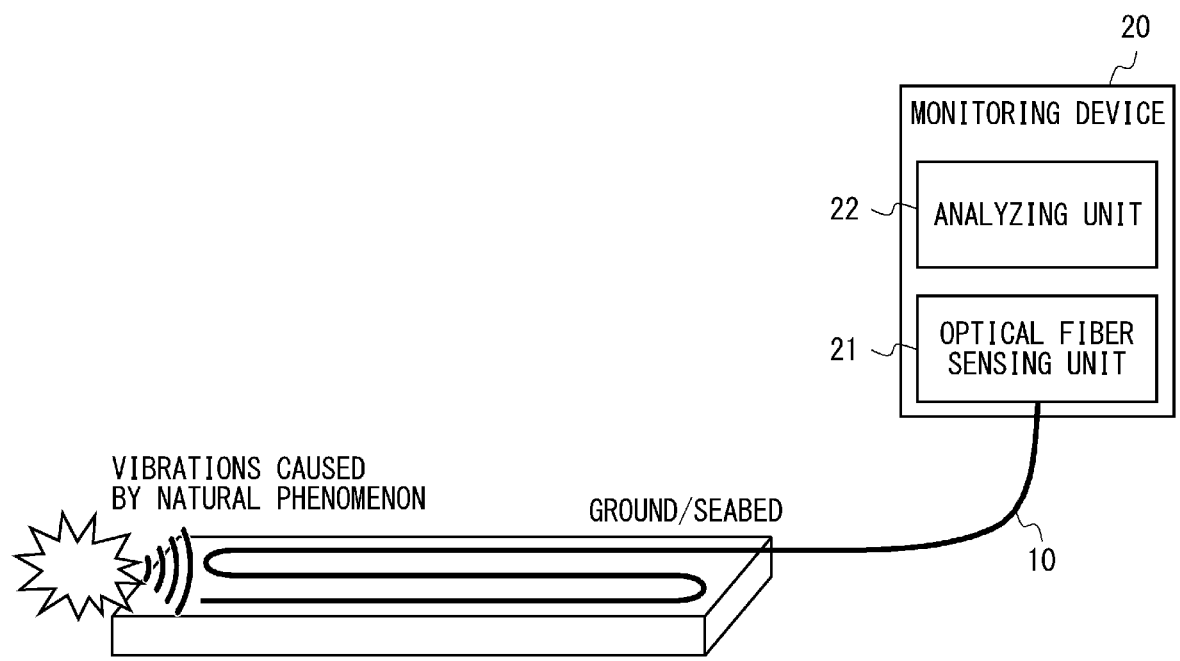
FIG. 10 illustrates an example of a configuration of a monitoring system according to a second example embodiment.

In contrast, as illustrated in FIG. 10, an optical fiber 10 is laid two-dimensionally on the ground or the seabed in the monitoring system according to the second example embodiment. It is to be noted that although the optical fiber 10 is laid two-dimensionally in the example illustrated in FIG. 10, this is not a limiting example, and the optical fiber 10 may instead be laid three-dimensionally.

Other configurations according to the second example embodiment are similar to those according to the first example embodiment described above.

Figure 11:
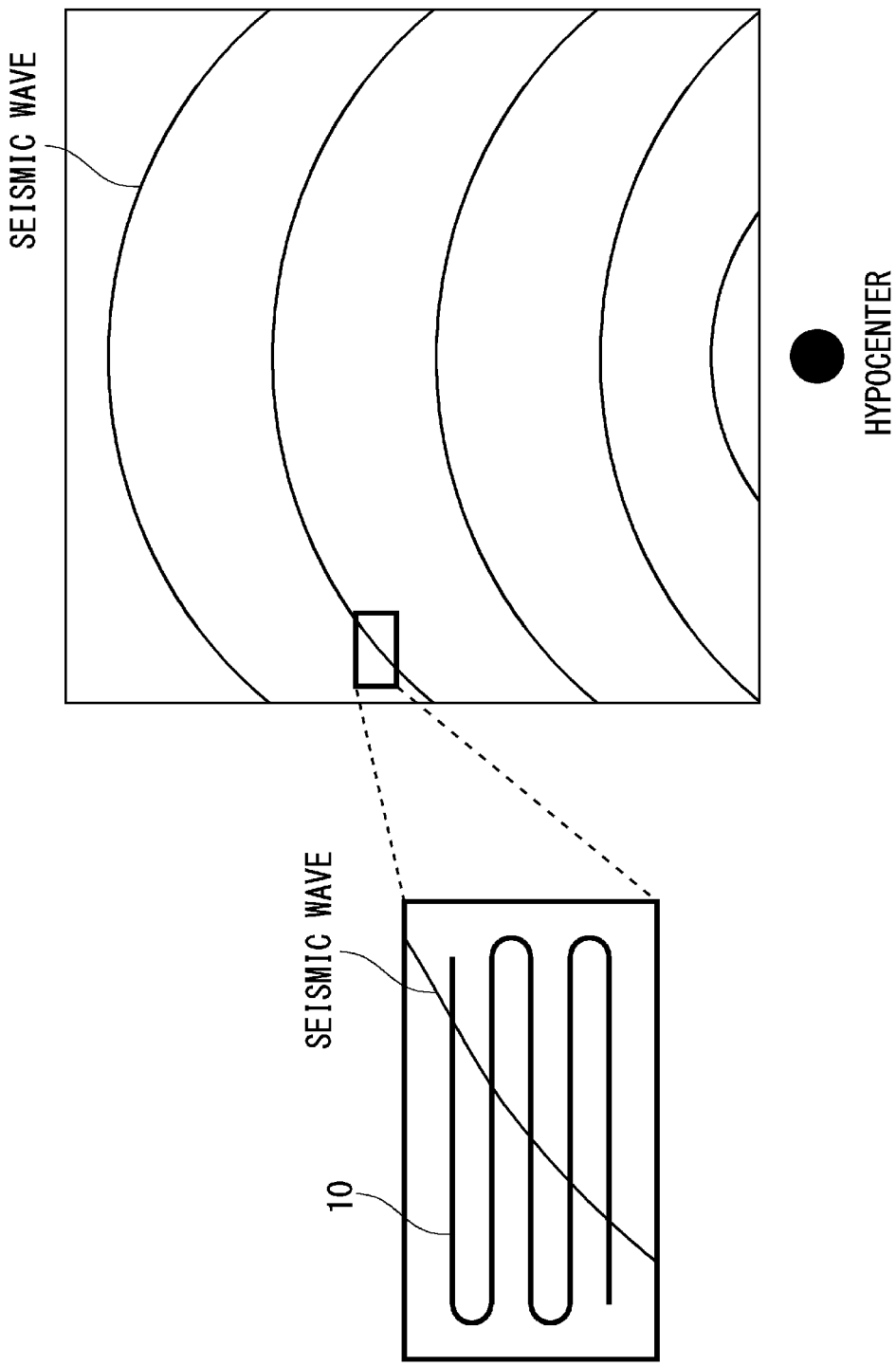
FIG. 11 illustrates an example visualizing how a seismic wave is detected two-dimensionally in the monitoring system according to the second example embodiment.

In this manner, in the monitoring system according to the second example embodiment, the optical fiber 10 is laid two-dimensionally on the ground or the seabed. Therefore, in a case where the source of vibrations lies at the hypocenter of an earthquake, as illustrated in FIG. 11, for example, the optical fiber 10 can detect the seismic waves two-dimensionally, and this makes it possible to detect a two-dimensional distribution of the unique pattern of the seismic waves.

As such, according to the second example embodiment, an analyzing unit 22 identifies a natural phenomenon that has caused vibrations based on the unique pattern of vibration data acquired by an optical fiber sensing unit 21 and the distribution of that unique pattern.

Figure 12:
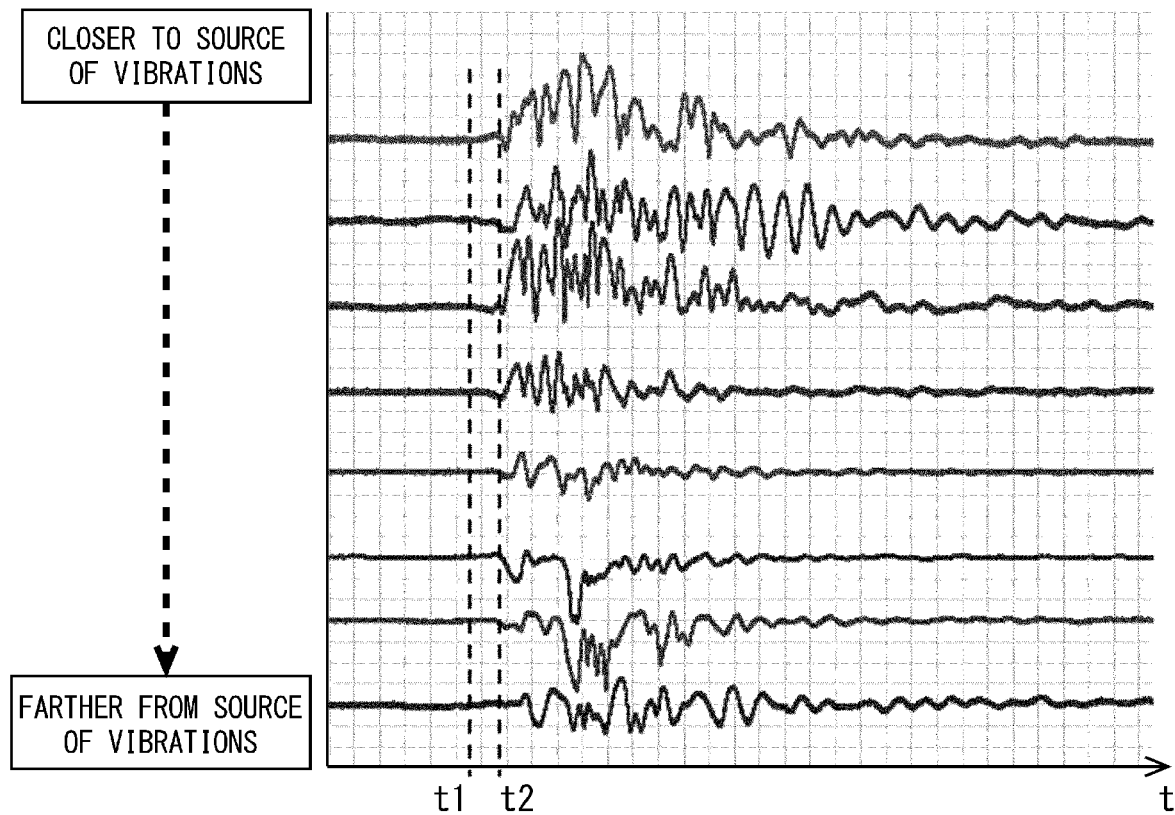
FIG. 12 illustrates an example of vibration data to be acquired by an optical fiber sensing unit according to the second example embodiment.

Specifically, when the analyzing unit 22 is to identify a natural phenomenon that has caused vibrations, the analyzing unit 22 acquires vibration data monitoring the vibrations (e.g., vibration data similar to the vibration data illustrated in FIG. 4) from the optical fiber sensing unit 21 and obtains vibration data such as the one illustrated in FIG. 12. FIG. 12 illustrates a distribution of unique patterns of vibrations detected at respective positions in the optical fiber 10, and shows pieces of vibration data similar to the one illustrated in FIG. 4 arranged in the vertical direction. In FIG. 12, the lower the vibration data is located in the figure, the farther the source of the vibrations is.

As described above according to the first example embodiment, the analyzing unit 22 can identify a natural phenomenon that has caused vibrations based on the unique pattern of the vibrations. For example, when the unique pattern is a unique pattern of seismic waves, the analyzing unit 22 can identify that the natural phenomenon that has caused the vibrations is an earthquake.

Moreover, the use of a distribution of a unique pattern makes it possible to increase the accuracy with which the analyzing unit 22 identifies a natural phenomenon. For example, the analyzing unit 22 can calculate the speed of propagation of vibrations based on the positions in the optical fiber 10 and the times at which unique patterns are detected at the respective positions. For example, in the example illustrated in FIG. 12, the analyzing unit 22 can calculate the speed of propagation of the vibrations based on the position closest to the source of the vibrations and the position farthest from the source of the vibrations in the optical fiber 10 and a time t1 and a time t2 at which the unique patterns are detected at the respective positions. With this configuration, for example, the analyzing unit 22 can not only identify that the unique pattern is a unique pattern of a seismic wave but also identify whether that seismic wave is the P wave or the S wave.

Moreover, the use of a distribution of a unique pattern enables the analyzing unit 22 to calculate the direction of propagation of vibrations as well as the speed of propagation of the vibrations as described above. Accordingly, upon identifying a natural phenomenon that has caused vibrations, the analyzing unit 22 may further calculate the speed and the direction of propagation of the vibrations and identify the position (the distance and the depth) of the source of the vibrations based on the calculated speed and direction. At this point, the analyzing unit 22 may cooperate with an existing seismometer and learn the pattern of association between the distribution of a unique pattern and the position of the hypocenter observed with the seismometer when the corresponding distribution has been observed.

Moreover, in FIG. 12, the analyzing unit 22 may regard the unique patterns detected at the respective positions in the optical fiber 10 as one pattern and identify a natural phenomenon with a method similar to the method A1 or the method A2 described above according to the first example embodiment.

Operation of Second Example Embodiment

Now, with reference to FIG. 13, a general flow of an operation of the monitoring system according to the second example embodiment will be described.

Figure 13:
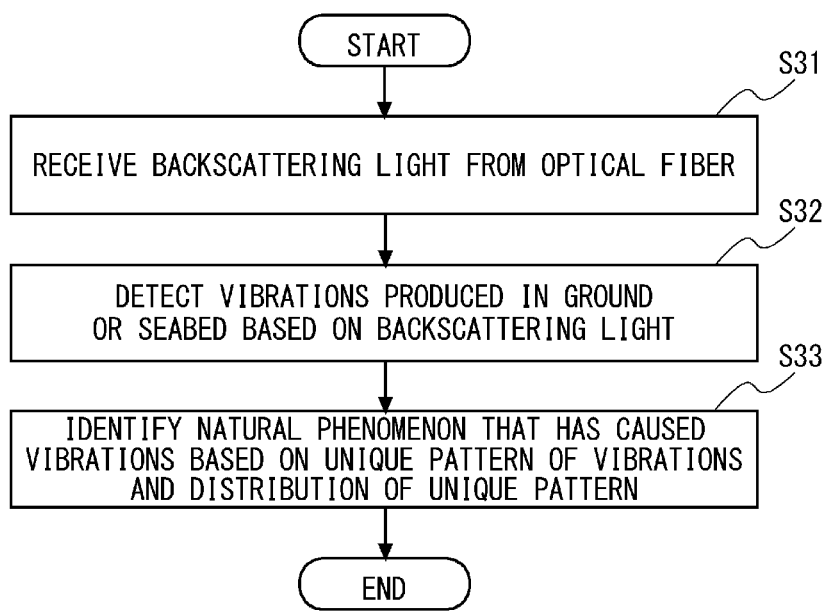
FIG. 13 is a flowchart illustrating an example of a flow of an operation of the monitoring system according to the second example embodiment.

As illustrated in FIG. 13, first, the optical fiber sensing unit 21 inputs pulsed light to the optical fiber 10 laid on the ground or the seabed and receives backscattering light from the optical fiber 10 (step S31).

Next, the optical fiber sensing unit 21 detects vibrations produced in the ground or the seabed based on the backscattering light received from the optical fiber 10 (step S32).

Then, the analyzing unit 22 identifies a natural phenomenon that has caused the vibrations based on the unique pattern of the vibrations detected by the optical fiber sensing unit 21 and the distribution of that unique pattern (step S33).

Advantageous Effects of Second Example Embodiment

As described above, according to the second example embodiment, the analyzing unit 22 identifies a natural phenomenon that has caused vibrations based on the unique pattern of the vibrations detected by the optical fiber sensing unit 21 and the distribution of that unique pattern. This configuration makes it possible to further increase the accuracy of identifying a natural phenomenon that has caused vibrations. Other advantageous effects are similar to those according to the first example embodiment described above.

Third Example Embodiment

Configuration of Third Example Embodiment

In the monitoring system according to the first example embodiment described above, vibrations produced in the ground or the seabed are detected as a parameter, and a natural phenomenon that has caused the vibrations is identified based on the unique pattern of the vibrations. Specifically, a natural phenomenon that has caused vibrations is identified from among, for example but not limited to, an earthquake, a tsunami, a volcanic tremor, a crustal movement, a volcanic activity, and a movement of groundwater.

When a natural phenomenon, such as an earthquake, a tsunami, a volcanic tremor, a crustal movement, a volcanic activity, or a movement of groundwater, occurs in the area where an optical fiber 10 is laid, however, not only are vibrations produced, but sounds or temperature changes also occur. Such sounds and temperatures held after the change are also propagated to the optical fiber 10 and superposed onto the back-reflection light transmitted by the optical fiber 10. Accordingly, an optical fiber sensing unit 21 can also detect the sounds and the temperatures produced through a natural phenomenon based on the backscattering light received from the optical fiber 10.

For example, the optical fiber sensing unit 21 can detect a sound and a temperature produced in the ground or the seabed by detecting the backscattering light received from the optical fiber 10 by use of, respectively, a distributed acoustic sensor and a distributed temperature sensor and acquire acoustic data of the detected sound and temperature data of the detected temperature.

In this example, the pattern of a sound and the pattern of a temperature detected by the optical fiber sensing unit 21 are each also a fluctuation pattern that fluctuates dynamically and vary depending on the type of a natural phenomenon that has caused the vibrations. Therefore, the acoustic data of a sound and the temperature data of a temperature detected by the optical fiber sensing unit 21 each also have a dynamic unique pattern corresponding to the type of the natural phenomenon.

As such, according to the third example embodiment, the optical fiber sensing unit 21 further detects at least one of a sound or a temperature produced in the ground or the seabed as a parameter, and an analyzing unit 22 identifies a natural phenomenon that has caused the vibrations based on the unique pattern of the vibrations detected by the optical fiber sensing unit 21 and the unique pattern of at least one of the detected sound or the detected temperature.

The configuration according to the third example embodiment itself is similar to the configuration according to the first example embodiment described above.

For example, as described above according to the first example embodiment, the analyzing unit 22 can identify that a natural phenomenon that has caused vibrations is an earthquake based on the unique pattern of the vibrations. At this point, the optical fiber sensing unit 21 can further detect a sound produced by the earthquake, and the analyzing unit 22 can identify the natural phenomenon as an earthquake based on the combination of the unique pattern of the sound and the unique pattern of the vibrations. This can further increase the accuracy of identification.

Moreover, as described above according to the first example embodiment, the analyzing unit 22 can identify that a natural phenomenon that has caused vibrations is a tsunami based on the unique pattern of the vibrations. At this point, the optical fiber sensing unit 21 can further detect a sound produced by the movement of the seawater, and the analyzing unit 22 can identify the natural phenomenon as a tsunami based on the combination of the unique pattern of the sound and the unique pattern of the vibrations. This can further increase the accuracy of identification.

Moreover, as described above according to the first example embodiment, the analyzing unit 22 can identify that a natural phenomenon that has caused vibrations is a volcanic tremor, a crustal movement, a volcanic activity, or the like based on the unique pattern of the vibrations. At this point, the optical fiber sensing unit 21 can further detect a sound and a temperature produced by the movement of the ground, and the analyzing unit 22 can identify the natural phenomenon as a volcanic tremor, a crustal movement, a volcanic activity, or the like based on the combination of the unique pattern of the sound, the unique pattern of the temperature, and the unique pattern of the vibrations. This can further increase the accuracy of identification.

Moreover, as described above according to the first example embodiment, the analyzing unit 22 can identify that a natural phenomenon that has caused vibrations is a movement of groundwater based on the unique pattern of the vibrations. At this point, the optical fiber sensing unit 21 can further detect a sound produced by the movement of the groundwater, and the analyzing unit 22 can identify the natural phenomenon as a movement of groundwater based on the combination of the unique pattern of the sound and the unique pattern of the vibrations. This can further increase the accuracy of identification.

Moreover, when a natural phenomenon is accumulation of magma in the ground, approaching magma can be detected based on a change in the temperature. Therefore, the optical fiber sensing unit 21 can detect a temperature produced by a movement of magma, and the analyzing unit 22 can identify a natural phenomenon as accumulation of magma based on the unique pattern of the detected temperature. At this point, the optical fiber sensing unit 21 can further detect vibrations produced by the movement of magma, and the analyzing unit 22 can identify the natural phenomenon as accumulation of magma based on the combination of the unique pattern of the vibrations and the unique pattern of the temperature. This can further increase the accuracy of identification.

Operation of Third Example Embodiment

Now, with reference to FIG. 14, a general flow of an operation of the monitoring system according to the third example embodiment will be described. In the following description, the optical fiber sensing unit 21 detects both a sound and a temperature in addition to vibrations.

Figure 14:
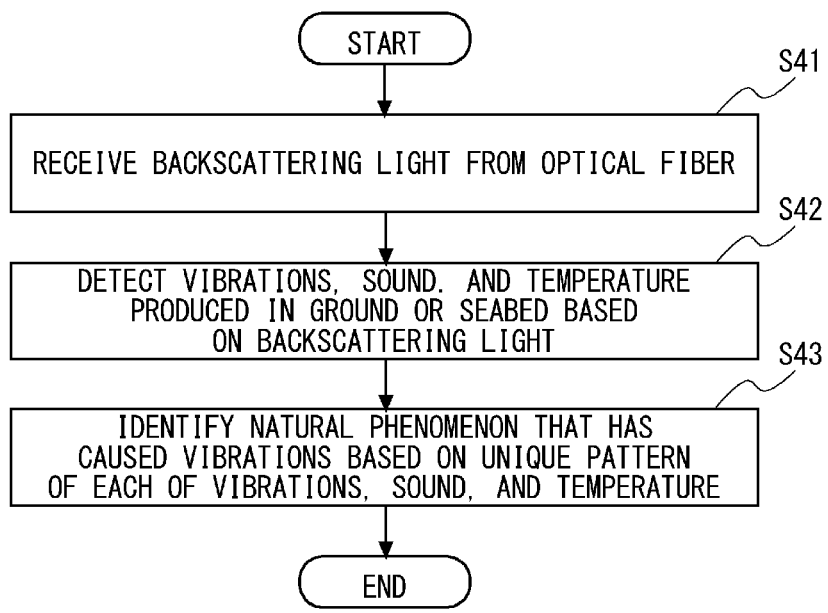
FIG. 14 is a flowchart illustrating an example of a flow of an operation of a monitoring system according to a third example embodiment.

As illustrated in FIG. 14, first, the optical fiber sensing unit 21 inputs pulsed light to the optical fiber 10 laid on the ground or the seabed and receives backscattering light from the optical fiber 10 (step S41).

Next, the optical fiber sensing unit 21 detects vibrations, a sound, and a temperature produced in the ground or the seabed based on the backscattering light received from the optical fiber 10 (step S42).

Then, the analyzing unit 22 identifies a natural phenomenon that has caused the vibrations based on the unique pattern of each of the vibrations, the sound, and the temperature detected by the optical fiber sensing unit 21 (step S43).

Advantageous Effects of Third Example Embodiment

As described above, according to the third example embodiment, the optical fiber sensing unit 21 further detects at least one of a sound or a temperature produced in the ground or the seabed, and the analyzing unit 22 identifies a natural phenomenon that has caused vibrations based on the unique pattern of the vibrations detected by the optical fiber sensing unit 21 and the unique pattern of at least one of the detected sound or the detected temperature. This configuration makes it possible to further increase the accuracy of identifying a natural phenomenon that has caused vibrations. Other advantageous effects are similar to those according to the first example embodiment described above.

According to the third example embodiment, a configuration similar to the configuration according to the second example embodiment described above may be employed, and the analyzing unit 22 may identify a natural phenomenon by additional use of the distribution of the unique pattern of vibrations and the distribution of the unique pattern of at least one of a sound or a temperature. This configuration makes it possible to further increase the accuracy of identifying a natural phenomenon that has caused vibrations.

Thus far, the present disclosure has been described with reference to some example embodiments, but the present disclosure is not limited by the example embodiments described above. Various modifications that a person skilled in the art can appreciate can be made to the configurations and the details of the present disclosure within the scope of the present disclosure.

For example, the analyzing unit 22 may additionally perform an operation of predicting whether a predetermined natural phenomenon will occur in the future based on a change over time in the unique pattern of vibrations produced in the ground or the seabed.

Now, a method with which the analyzing unit 22 predicts whether a predetermined natural phenomenon will occur in the future will be described in detail. The analyzing unit 22 may make such a prediction with any one of the following methods B1 to B4.

(1) Method B1

Figure 15:
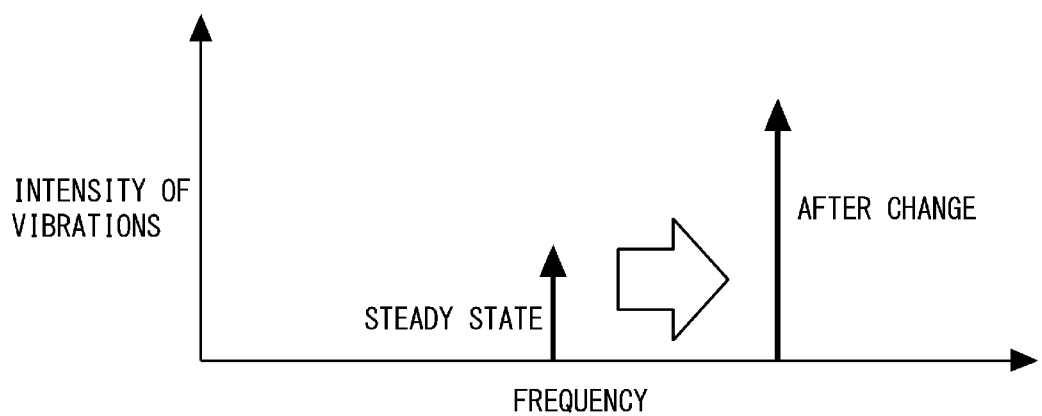
FIG. 15 illustrates an example of vibration data to be acquired by an optical fiber sensing unit according to another example embodiment.

First, the method B1 will be described with reference to FIG. 15. FIG. 15 illustrates vibration data (the horizontal axis represents the frequency, and the vertical axis represents the intensity of vibrations) obtained by performing fast Fourier transform (FFT) on vibration data (the horizontal axis represents the time, and the vertical axis represents the intensity of vibrations) of vibrations produced in the ground or the seabed where the optical fiber 10 is laid.

In the vibration data illustrated in FIG. 15, a frequency peak of the intensity of the vibrations arises.

For example, in a case where there is a possibility that a crustal movement, a movement of groundwater, or the like may occur as a natural phenomenon, the frequency at which a frequency peak arises changes from the steady state and shifts to a high-frequency side.

Therefore, the analyzing unit 22 predicts whether a crustal movement, a movement of groundwater, or the like may occur as a natural phenomenon in the future based on the frequency at which a frequency peak arises in the vibration data (e.g., vibration data similar to the vibration data illustrated in FIG. 15) acquired from the optical fiber sensing unit 21. At this point, the analyzing unit 22 may calculate the risk of such a natural phenomenon occurring based on the amount of shift of the frequency at which the frequency peak arises from the steady state.

(2) Method B2

Figure 16:
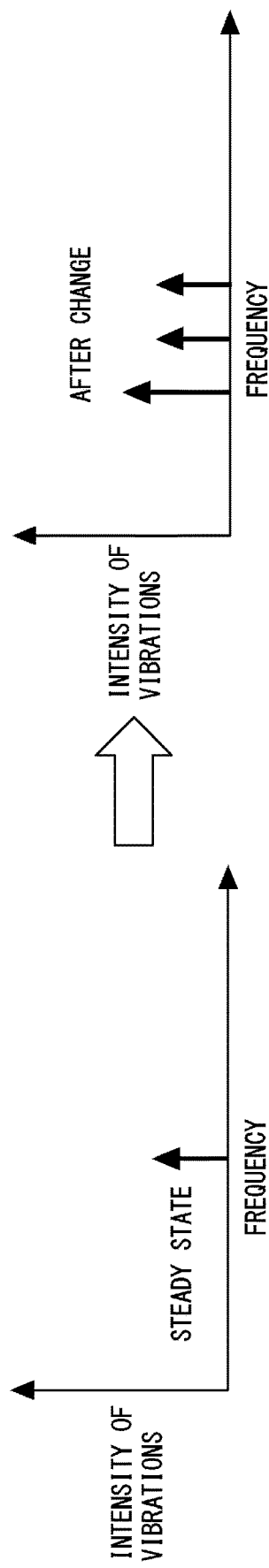
FIG. 16 illustrates an example of vibration data to be acquired by an optical fiber sensing unit according to another example embodiment.

Next, the method B2 will be described with reference to FIG. 16. FIG. 16 illustrates vibration data (the horizontal axis represents the frequency, and the vertical axis represents the intensity of vibrations) obtained by performing FFT on vibration data (the horizontal axis represents the time, and the vertical axis represents the intensity of vibrations) of vibrations produced in the ground or the seabed where the optical fiber 10 is laid.

In the vibration data illustrated in FIG. 16, a frequency peak of the intensity of the vibrations arises.

For example, in a case where there is a possibility that a crustal movement, a movement of groundwater, or the like may occur as a natural phenomenon, the frequency at which a frequency peak arises and the number of frequency peaks change from the steady state.

Therefore, the analyzing unit 22 predicts whether a crustal movement, a movement of groundwater, or the like may occur as a natural phenomenon in the future based on the frequency at which a frequency peak arises and the number of frequency peaks in the vibration data (e.g., vibration data similar to the vibration data illustrated in FIG. 16) acquired from the optical fiber sensing unit 21. At this point, the analyzing unit 22 may calculate the risk of such a natural phenomenon occurring based on the amount of shift of the frequency at which a frequency peak arises from the steady state or based on the number of increase in the number of frequency peaks from the steady state.

(3) Method B3

Figure 17:
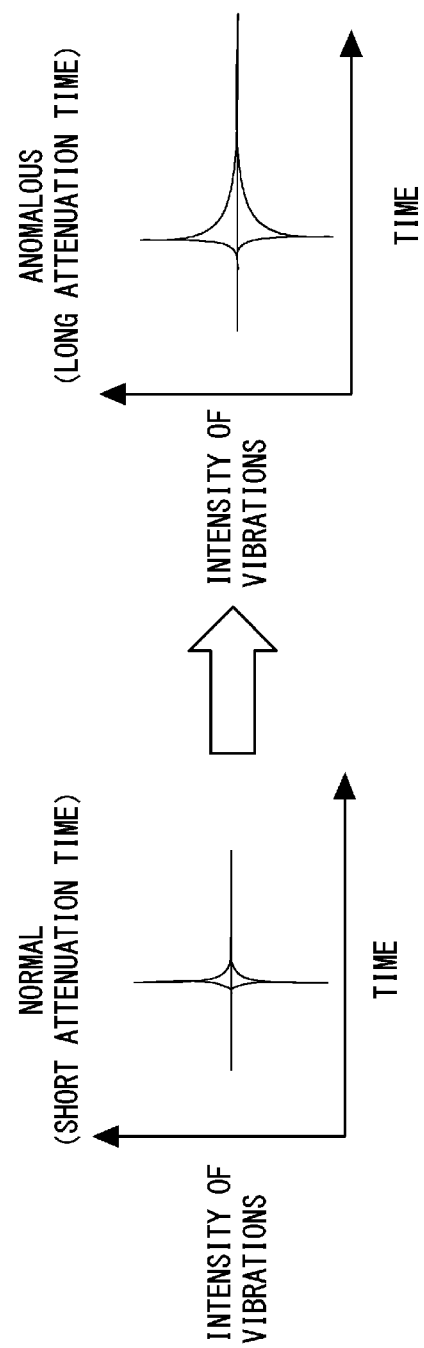
FIG. 17 illustrates an example of vibration data to be acquired by an optical fiber sensing unit according to another example embodiment.

Next, the method B3 will be described with reference to FIG. 17. FIG. 17 illustrates vibration data (the horizontal axis represents the time, and the vertical axis represents the intensity of vibrations) of vibrations produced in the ground or the seabed where the optical fiber 10 is laid.

In the vibration data illustrated in FIG. 17, the vibrations produced in the ground or the seabed are attenuated afterward.

For example, in a case where there is a possibility that a change in the structure of the ground, a collapse of the ground, or the like may occur as a natural phenomenon, this attenuation time becomes longer.

Therefore, the analyzing unit 22 predicts whether a change in the structure of the ground, a collapse of the ground, or the like may occur as a natural phenomenon in the future based on the attenuation time in the vibration data (e.g., vibration data similar to the vibration data illustrated in FIG. 17) acquired from the optical fiber sensing unit 21.

(4) Method B4

Figure 18:
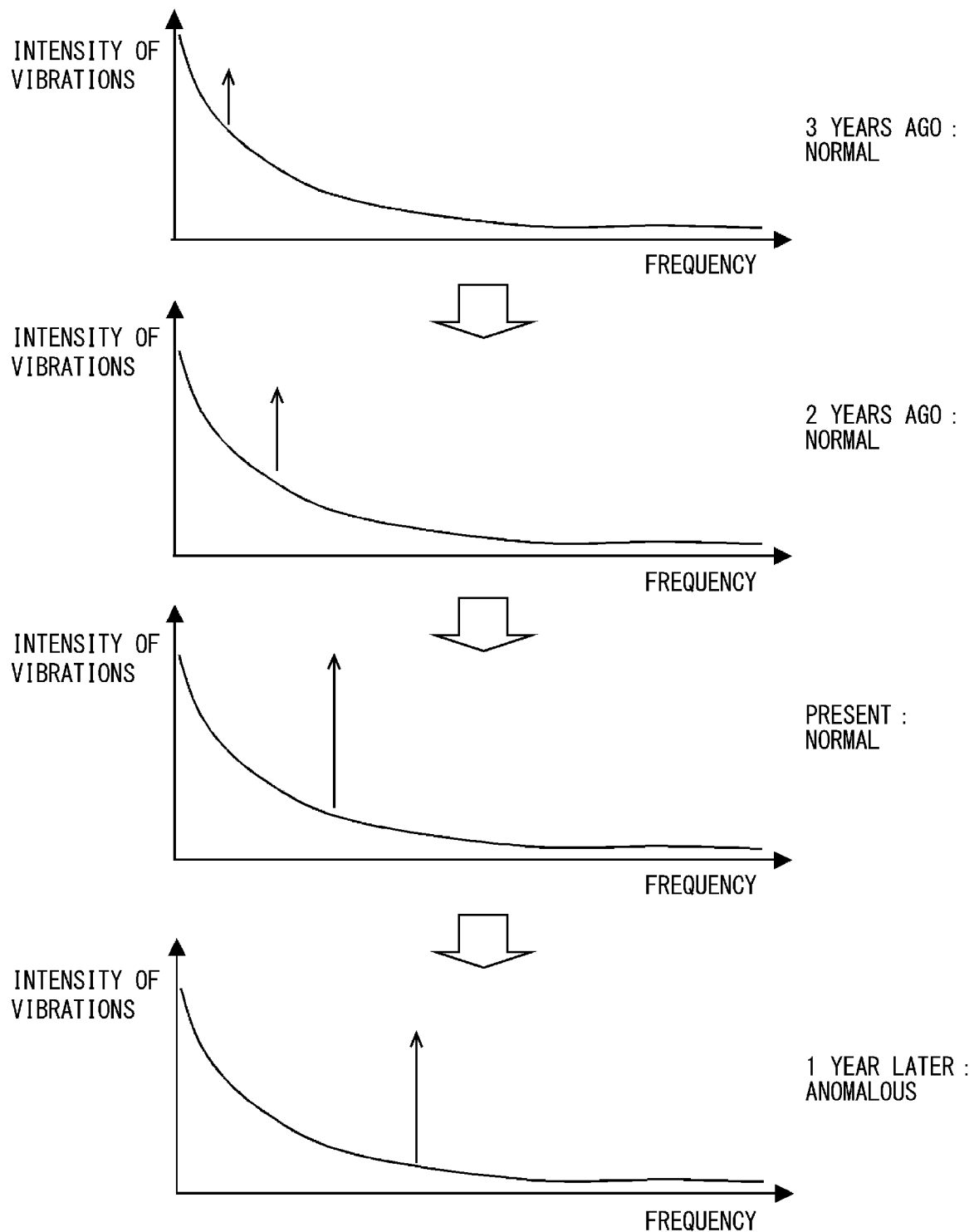
FIG. 18 illustrates an example of vibration data to be acquired by an optical fiber sensing unit according to another example embodiment.

Next, the method B4 will be described with reference to FIG. 18. FIG. 18 illustrates pieces of vibration data similar to the one illustrated in FIG. 15 arranged in time series.

As illustrated in FIG. 18, the analyzing unit 22 predicts vibration data of one year later based on a change over time of the vibration data from three years ago, the vibration data from two years ago, and the current vibration data and predicts whether a crustal movement, a movement of groundwater, or the like may occur as a natural phenomenon in the future based on the predicted vibration data of one year later. In this example, the analyzing unit 22 predicts an occurrence of an anomalous state one year later (i.e., a state with a sign of a natural phenomenon) based on the frequency at which a frequency peak arises in the vibration data of one year later.

(5) Method B5

The method B5 involves machine learning (e.g., deep learning or the like) of, as a unique pattern of vibration data, unique patterns corresponding to the risks of a predetermined natural phenomenon occurring and predicts whether a predetermined natural phenomenon will occur in the future by use of the learning result (initial training model) of the machine learning.

The method of machine learning in the method B5 is similar to the method illustrated in FIG. 6 described above in relation to the method A2 according to the first example embodiment. FIG. 19 illustrates an example of training data in the case of the method B5. FIG. 19 illustrates an example of training data for training a model on three pieces of vibration data A, B, and C. Each vibration data, for example, takes the form similar to the vibration data illustrated in any of FIGS. 15 to 18. In FIG. 19, a larger value of the risk level indicates a higher risk of a predetermined natural phenomenon occurring.

In a case where the analyzing unit 22 predicts whether a predetermined natural phenomenon will occur in the future, the analyzing unit 22 inputs vibration data (e.g., vibration data similar to any of those illustrated in FIGS. 15 to 18) acquired from the optical fiber sensing unit 21 into the initial training model. Thus, the analyzing unit 22 obtains the risk of the predetermined natural phenomenon occurring in the future from the result output by the initial training model.

In this example, the analyzing unit 22 may predict whether a predetermined natural phenomenon will occur in the future based on not only a change over time in the unique pattern of vibrations produced in the ground or the seabed but also a change over time in the unique pattern of at least one of a sound or a temperature produced in the ground or the seabed. Moreover, the analyzing unit 22 may predict whether a predetermined natural phenomenon will occur in the future based on a change over time in the distribution of vibrations produced in the ground or the seabed and a change over time in the distribution of the unique pattern of at least one of a sound or a temperature produced in the ground or the seabed.

The whole or part of the embodiments disclosed above can be described as, but not limited to, the following supplementary notes.

(Supplementary Note 1)

A monitoring system comprising:
an optical fiber laid on a ground or a seabed;
an optical fiber sensing unit configured to receive an optical signal from the optical fiber and detect a vibration produced in the ground or the seabed based on the optical signal; and
an analyzing unit configured to identify a natural phenomenon that has caused the detected vibration based on a unique pattern of the detected vibration.

(Supplementary Note 2)

The monitoring system according to Supplementary note 1, wherein the analyzing unit is configured to identify the natural phenomenon that has caused the detected vibration based on the unique pattern of the detected vibration and a distribution of the unique pattern.

(Supplementary Note 3)

The monitoring system according to Supplementary note 2, wherein the analyzing unit is configured to
calculate a direction of propagation and a speed of propagation of the detected vibration based on the unique pattern of the detected vibration and the distribution of the unique pattern and
identify a position of a vibration source of the detected vibration based on the calculated direction and speed.

(Supplementary Note 4)

The monitoring system according to any one of Supplementary notes 1 to 3, wherein
the optical fiber sensing unit is configured to further detect at least one of a sound or a temperature produced in the ground or the seabed based on the optical signal received from the optical fiber, and
the analyzing unit is configured to identify the natural phenomenon that has caused the detected vibration based on the unique pattern of the detected vibration and a unique pattern of at least one of the detected sound or the detected temperature.

(Supplementary Note 5)

The monitoring system according to any one of Supplementary notes 1 to 4, wherein the analyzing unit is configured to predict whether a predetermined natural phenomenon will occur in future based on a change over time in the unique pattern of the detected vibration.

(Supplementary Note 6)

A monitoring device comprising:
an optical fiber sensing unit configured to receive an optical signal from an optical fiber laid on a ground or a seabed and detect a vibration produced in the ground or the seabed based on the optical signal; and
an analyzing unit configured to identify a natural phenomenon that has caused the detected vibration based on a unique pattern of the detected vibration.

(Supplementary Note 7)

The monitoring device according to Supplementary note 6, wherein the analyzing unit is configured to identify the natural phenomenon that has caused the detected vibration based on the unique pattern of the detected vibration and a distribution of the unique pattern.

(Supplementary Note 8)

The monitoring device according to Supplementary note 7, wherein the analyzing unit is configured to
calculate a direction of propagation and a speed of propagation of the detected vibration based on the unique pattern of the detected vibration and the distribution of the unique pattern and
identify a position of a vibration source of the detected vibration based on the calculated direction and speed.

(Supplementary Note 9)

The monitoring device according to any one of Supplementary notes 6 to 8, wherein
the optical fiber sensing unit is configured to further detect at least one of a sound or a temperature produced in the ground or the seabed based on the optical signal received from the optical fiber, and
the analyzing unit is configured to identify the natural phenomenon that has caused the detected vibration based on the unique pattern of the detected vibration and a unique pattern of at least one of the detected sound or the detected temperature.

(Supplementary Note 10)

The monitoring device according to any one of Supplementary notes 6 to 9, wherein the analyzing unit is configured to predict whether a predetermined natural phenomenon will occur in future based on a change over time in the unique pattern of the detected vibration.

(Supplementary Note 11)

A monitoring method to be performed by a monitoring device, the monitoring method comprising:
a step of receiving an optical signal from an optical fiber laid on a ground or a seabed and detecting a vibration produced in the ground or the seabed based on the optical signal; and
a step of identifying a natural phenomenon that has caused the detected vibration based on a unique pattern of the detected vibration.

(Supplementary Note 12)

A non-transitory computer-readable medium storing a program that causes a computer to execute:
a procedure of receiving an optical signal from an optical fiber laid on a ground or a seabed and detecting a vibration produced in the ground or the seabed based on the optical signal; and
a procedure of identifying a natural phenomenon that has caused the detected vibration based on a unique pattern of the detected vibration.

This application claims priority to Japanese Patent Application No. 2019-068644, filed on Mar. 29, 2019, the entire disclosure of which is incorporated herein.

REFERENCE SIGNS LIST 10 optical fiber
20 monitoring device
21 optical fiber sensing unit
22 analyzing unit
40 computer
401 processor
402 memory
403 storage
404 input/output interface
4041 display device
4042 input device
405 communication interface

What is claimed is:
1. A monitoring system comprising:
an optical fiber laid on a ground or a seabed;
an optical fiber sensing unit configured to receive an optical signal from the optical fiber and detect a vibration produced in the ground or the seabed based on the optical signal; and
an analyzing unit configured to identify a natural phenomenon that has caused the detected vibration based on a unique pattern of the detected vibration, wherein the analyzing unit is configured to;
identify the natural phenomenon that has caused the detected vibration based on the unique pattern of the detected vibration using a trained model;
calculate a rate of match of the unique pattern of the detected vibration against a plurality of predetermined vibration patterns;
determine whether the unique pattern matches any of the plurality of predetermined vibration patterns based on the calculated rate of match; and
classify the natural phenomenon based on the calculated rate of match.

2. The monitoring system according to claim 1, wherein the analyzing unit is configured to:
calculate a direction of propagation and a speed of propagation of the detected vibration based on the unique pattern of the detected vibration and the distribution of the unique pattern; and
identify a position of a vibration source of the detected vibration based on the calculated direction and speed.

3. The monitoring system according to claim 1, wherein the optical fiber sensing unit is configured to further detect at least one of a sound or a temperature produced in the ground or the seabed based on the optical signal received from the optical fiber, and
wherein the analyzing unit is configured to identify the natural phenomenon that has caused the detected vibration based on the unique pattern of the detected vibration and a unique pattern of at least one of the detected sound or the detected temperature.

4. The monitoring system according to claim 1, wherein the analyzing unit is configured to predict whether a predetermined natural phenomenon will occur in future based on a change over time in the unique pattern of the detected vibration.

5. The monitoring system according to claim 1, wherein the analyzing unit is configured to classify the natural phenomenon into one of an earthquake, a volcanic tremor, or a crustal movement.

6. The monitoring system according to claim 1, wherein the analyzing unit is configured to compare the rate of match of the unique pattern against a threshold for identifying the natural phenomenon.

7. The monitoring system according to claim 1, wherein the optical fiber is laid two-dimensionally on the ground.

8. The monitoring system according to claim 7, wherein the analyzing unit is configured to determine a hypocenter of the natural phenomenon using a detected two-dimensional distribution of the unique pattern of detected vibration.

9. The monitoring system according to claim 1, wherein the ground is a seabed.

10. A monitoring device comprising:
an optical fiber sensing unit configured to receive an optical signal from an optical fiber laid on a ground or a seabed and detect a vibration produced in the ground or the seabed based on the optical signal; and
an analyzing unit configured to identify a natural phenomenon that has caused the detected vibration based on a unique pattern of the detected vibration,
wherein the analyzing unit is configured to:
identify the natural phenomenon that has caused the detected vibration based on the unique pattern of the detected using a trained model;
calculate a rate of match of the unique pattern of the detected vibration against a plurality of predetermined vibration patterns;
determine whether the unique pattern matches any of the plurality of predetermined vibration patterns based on the calculated rate of match; and
classify the natural phenomenon based on the calculated rate of match.

11. The monitoring device according to claim 10, wherein the analyzing unit is configured to:
calculate a direction of propagation and a speed of propagation of the detected vibration based on the unique pattern of the detected vibration and the distribution of the unique pattern; and
identify a position of a vibration source of the detected vibration based on the calculated direction and speed.

12. The monitoring device according to claim 10, wherein:
the optical fiber sensing unit is configured to further detect at least one of a sound or a temperature produced in the ground or the seabed based on the optical signal received from the optical fiber, and
the analyzing unit is configured to identify the natural phenomenon that has caused the detected vibration based on the unique pattern of the detected vibration and a unique pattern of at least one of the detected sound or the detected temperature.

13. The monitoring device according to claim 10, wherein the analyzing unit is configured to predict whether a predetermined natural phenomenon will occur in future based on a change over time in the unique pattern of the detected vibration.

14. A monitoring method to be performed by a monitoring device, the monitoring method comprising:
an operation of receiving an optical signal from an optical fiber laid on a ground or a seabed and detecting a vibration produced in the ground or the seabed based on the optical signal; and
an operation of identifying a natural phenomenon that has caused the detected vibration based on a unique pattern of the detected vibration,
wherein the analyzing unit is configured to:
identify the natural phenomenon that has caused the detected vibration based on the unique pattern of the detected vibration using a trained model;
calculate a rate of match of the unique pattern of the detected vibration against a plurality of predetermined vibration patterns;
determine whether the unique pattern matches any of the plurality of predetermined vibration patterns based on the calculated rate of match; and
classify the natural phenomenon based on the calculated rate of match.

* * * * *